(12) United States Patent
Noddings et al.

(10) Patent No.: US 8,408,817 B2
(45) Date of Patent: Apr. 2, 2013

(54) CONTROLLED RADIUS SPLICE PROTECTOR AND FABRICATION PROCESS

(75) Inventors: Kenneth C. Noddings, Manhattan Beach, CA (US); Terry L. Holcomb, Torrance, CA (US); Mahmood A. Majid, Westminster, CA (US)

(73) Assignee: The Boeing Company, Chicago, IL (US)

( * ) Notice: Subject to any disclaimer, the term of this patent is extended or adjusted under 35 U.S.C. 154(b) by 504 days.

(21) Appl. No.: 12/413,912

(22) Filed: Mar. 30, 2009

(65) Prior Publication Data

US 2010/0247044 A1 Sep. 30, 2010

(51) Int. Cl.
G02B 6/255 (2006.01)
G02B 6/26 (2006.01)
G02B 6/42 (2006.01)

(52) U.S. Cl. ............... 385/99; 385/32; 385/95; 385/96; 385/97; 385/98

(58) Field of Classification Search ............ 385/32, 385/95–99
See application file for complete search history.

(56) References Cited

U.S. PATENT DOCUMENTS

| 4,261,644 A * | 4/1981 | Giannaris ............... 385/99 |
| 4,647,150 A * | 3/1987 | DeSanti et al. ............ 385/98 |
| 5,807,242 A * | 9/1998 | Scheller et al. ............ 600/182 |
| 5,812,718 A * | 9/1998 | Carpenter et al. ............ 385/97 |
| 6,152,611 A * | 11/2000 | Mardirossian ............... 385/99 |
| 6,153,258 A * | 11/2000 | Goldman et al. ......... 427/163.2 |
| 6,981,802 B2 * | 1/2006 | Sasaki et al. ............... 385/60 |
| 7,330,621 B2 * | 2/2008 | Elkins et al. ............ 385/100 |
| 7,729,583 B2 * | 6/2010 | Elkins et al. ............ 385/102 |
| 2003/0053770 A1 * | 3/2003 | Noddings et al. ............ 385/95 |
| 2005/0158001 A1 * | 7/2005 | Fabian et al. ............ 385/128 |
| 2005/0244112 A1 * | 11/2005 | Bugaud et al. ............ 385/99 |
| 2006/0056782 A1 * | 3/2006 | Elkins et al. ............ 385/100 |
| 2008/0063351 A1 * | 3/2008 | Elkins et al. ............ 385/138 |
| 2010/0059229 A1 * | 3/2010 | Smith et al. ............ 166/346 |
| 2010/0278491 A1 * | 11/2010 | Noddings ............... 385/100 |

OTHER PUBLICATIONS

PTR-100 Operator's Manual Version 1.2 Copyright 1995 Vytran Corporation.
Splice Technologies, Flexible Mini Series Fusion Splice Protection Sleeve, retrieved from http://www.splicetechnologies.com/FlexibleMiniSeries.php?id=FSS-FLEX-MC20 on Feb. 19, 2013, Copyright 2012 (1 page).

* cited by examiner

*Primary Examiner* — Rhonda Peace
(74) *Attorney, Agent, or Firm* — Hanley, Flight & Zimmerman, LLC

(57) ABSTRACT

A controlled radius splice protector includes a first fiber optic fiber, a second fiber optic fiber, a fiber splice connecting the first fiber optic fiber and the second fiber optic fiber, a hot melted splice tubing extending over the fiber splice and a jacket tubing receiving the hot melted splice tubing and preformed to a selected bend radius.

20 Claims, 5 Drawing Sheets

CONTROLLED RADIUS SPLICE PROTECTOR AND FABRICATION PROCESS

STATEMENT REGARDING FEDERALLY SPONSORED RESEARCH OR DEVELOPMENT

The present invention was made with Government support under Contract Number FA8808-04-C-0022 awarded by the Air Force. The Government has certain rights in the invention.

TECHNICAL FIELD

The present disclosure relates to splice protectors for fiber optic fibers. More particularly, the present disclosure relates to a controlled radius splice protector and a fabrication process for a controlled radius splice protector which has a controlled bend radius and includes a hot melt sealing material to control bending stresses in a fiber splice.

BACKGROUND

Fiber optic spools may be used in many components and in many size-constrained applications. In some of these applications, a splice on a bend radius may be needed. However, standard splice protectors may not be available for a splice on a bend radius. Therefore, a recoating method for sealing the exposed glass area of the splice may be necessary.

One of the limitations of recoating methods for sealing spliced fibers on a bend radius is that such methods may not provide as much protection to the splice as would a standard straight splice protector. Therefore, a controlled radius splice protector which has a controlled bend radius and controls bending stresses in a fiber splice is necessary.

SUMMARY

The present disclosure is generally directed to a controlled radius splice protector. An illustrative embodiment of the controlled radius splice protector includes a first fiber optic fiber, a second fiber optic fiber, a fiber splice connecting the first fiber optic fiber and the second fiber optic fiber, a hot melted splice tubing extending over the fiber splice and a jacket tubing receiving the hot melted splice tubing and pre-formed to a selected bend radius.

The present disclosure is generally further directed to a controlled radius splice protector fabrication process. An illustrative embodiment of the process includes providing a jacket tubing, pre-forming the jacket tubing to a selected bend radius, providing first and second fiber optic fibers connected by a fiber splice, providing splice tubing, melting the splice tubing over the fiber splice and extending the splice tubing through the jacket tubing.

In some embodiments, the controlled radius splice protector fabrication process may include providing a jacket tubing; pre-forming the jacket tubing to a selected bend radius; providing a first fiber optic fiber; providing a second fiber optic fiber; forming a fiber splice by connecting the first fiber optic fiber and the second fiber optic fiber; providing splice tubing; extending the splice tubing over the fiber splice; melting the splice tubing on the fiber splice; and extending the splice tubing through the jacket tubing.

In some embodiments, the controlled radius splice protector may include a first fiber optic fiber having a first fiber end; a second fiber optic fiber having a second fiber end; a fiber splice connecting the first fiber end of the first fiber optic fiber and the second fiber end of the second fiber optic fiber; a hot melted splice tubing extending over the fiber splice and comprising an inner tubing layer comprising ethane-vinylacetate copolyester and an outer tubing layer comprising polyolefin; and a jacket tubing comprising polyaryletheretherketone thermoformed to a selected bend radius and receiving the hot melted splice tubing and pre-formed to a selected bend radius.

In some embodiments, the controlled radius splice protector fabrication process may include providing a jacket tubing comprising polyaryletheretherketone; pre-forming the jacket tubing to a selected bend radius; providing a first fiber optic fiber having a first fiber end; providing a second fiber optic fiber having a second fiber end; forming a fiber splice by connecting the first fiber end of the first fiber optic fiber and the second fiber end of the second fiber optic fiber; providing splice tubing comprising an inner tubing layer comprising ethane-vinylacetate copolyester and an outer tubing layer comprising polyolefin; extending the splice tubing over the fiber splice; melting the splice tubing on the fiber splice; extending the splice tubing through the jacket tubing; and thermally conditioning the splice tubing and the jacket tubing by cycling the splice tubing and the jacket tubing at expected operating temperature ranges.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
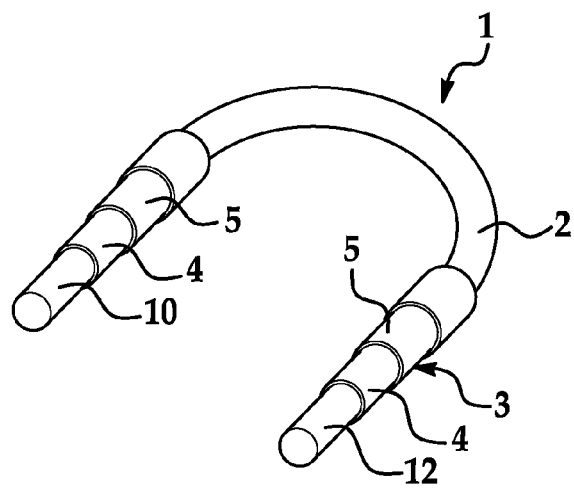
FIG. 1 is a perspective view of an illustrative embodiment of the controlled radius splice protector provided on a splice between a pair of spliced fiber optic fibers.
Figure 8:
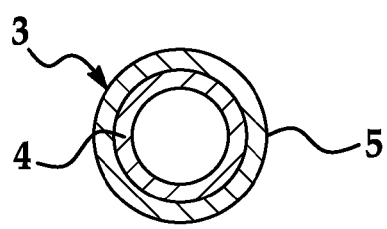
FIG. 8 is a cross-sectional view of the hot melted tubing.
Figures 9, 10:
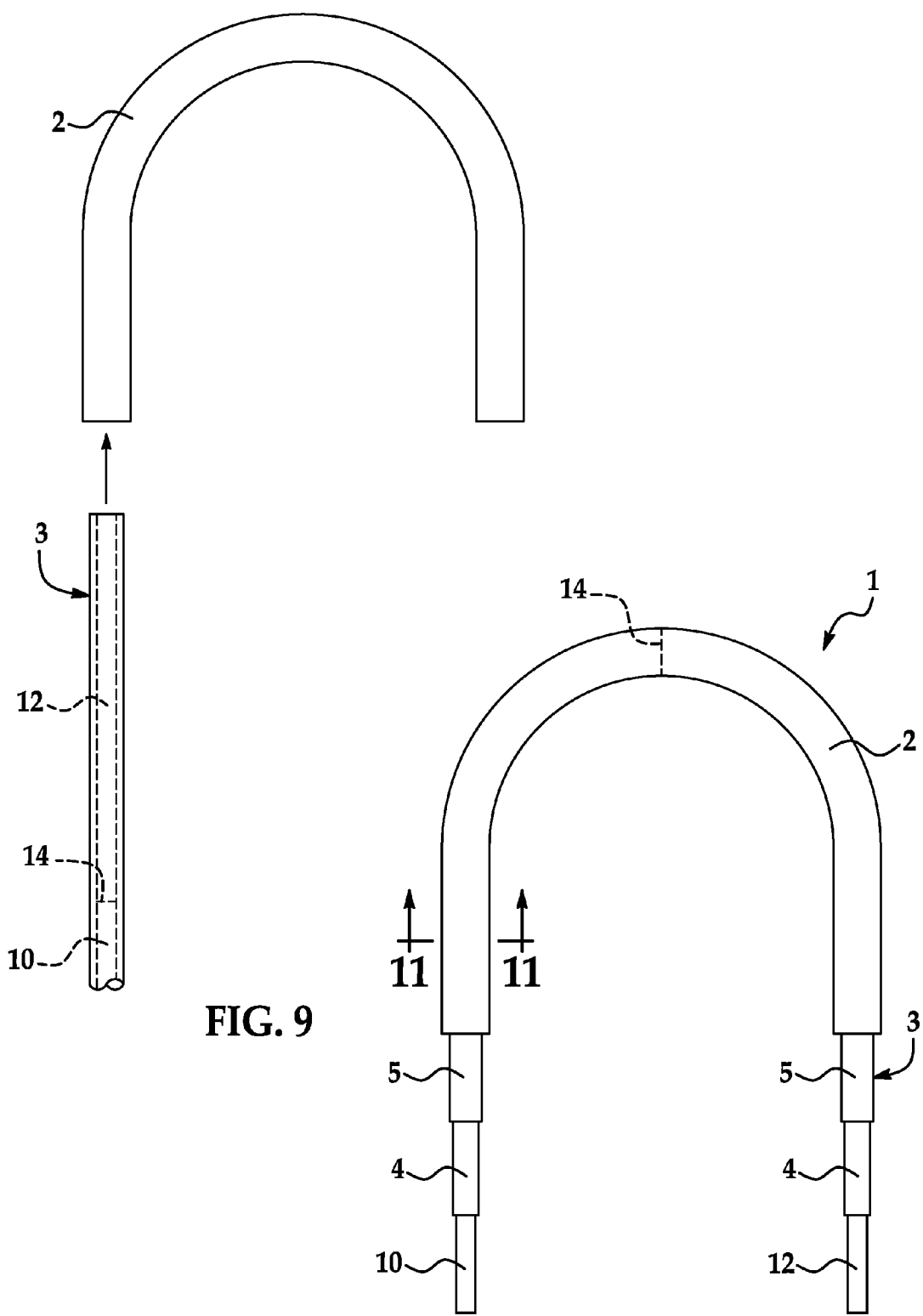
FIG. 9 is a top view illustrating insertion of the hot melted tubing with spliced fibers therein into the bended jacket tubing.
FIG. 10 is a top view of an illustrative embodiment of the controlled radius splice protector provided on a splice between a pair of spliced fiber optic fibers.
Figure 11:
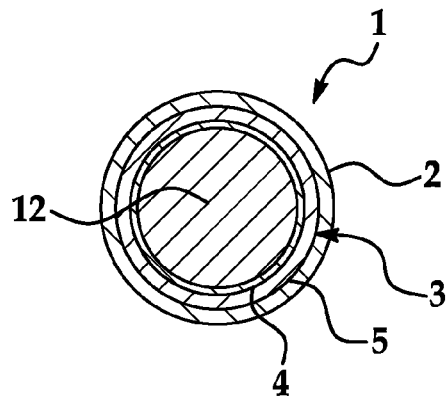
FIG. 11 is a cross-sectional view, taken along section lines 11-11 in FIG. 10.

Referring initially to FIGS. 1, 8, 10 and 11, an illustrative embodiment of the controlled radius splice protector is generally indicated by reference numeral 1 in FIGS. 1 and 10. The controlled radius splice protector 1 may protect a fiber splice 14 (FIG. 10) between a first fiber optic fiber 10 and a second fiber optic fiber 12 such as in applications in which the fiber splice 14 is located along a selected radius on a fiber spool (not shown), for example and without limitation. The controlled radius splice protector 1 may include an outer jacket tubing 2 which in fabrication of the controlled radius splice protector 1 may be thermally preformed to a desired bend radius, as will be hereinafter described. In some embodiments, the jacket tubing 2 may be PEEK (polyaryletheretherketone) or any other suitable thermo-formable material.

The controlled radius splice protector 1 may further include hot melted splice tubing 3 which may be initially applied to the first fiber optic fiber 10 and the second fiber optic fiber 12 across the fiber splice 14 and then melted in place after melting or fusing of the glass ends of the first fiber optic fiber 10 and the second fiber optic fiber 12 to form the fiber splice 14, as will be hereinafter described. After it is applied to the first fiber optic fiber 10 and the second fiber optic fiber 12, the hot melted splice tubing 3 may be extended through the outer jacket tubing 2 and the controlled radius splice protector 1 may be thermally conditioned at expected operating temperature ranges to relax thermal stresses, as will be hereinafter described. As shown in FIG. 8, in some embodiments, the hot melted splice tubing 3 may include an inner tubing layer 4 and an outer tubing layer 5 provided on the inner tubing layer 4. The inner tubing layer 4 may be an EVA hotmelt (ethane-vinylacetate copolyester), for example and without limitation. The outer tubing layer 5 may be a copolymer such as polyolefin, for example and without limitation.

The controlled radius splice protector 1 may be used in applications in which it is necessary to route spliced fiber optic fibers 10, 12 along a selected bend radius such as is often the case with fiber spools used in many size-constrained applications in satellite, avionic or other applications. By controlling the bend radius of the jacket tubing 2, the bend radius stresses applied to the first fiber optic fiber 10 and the second fiber optic fiber 12 may be controlled and fiber reliability increased by reducing or eliminating buffer/cladding distortions in the fiber optic fibers 10, 12. The curved fiber splice 14 may be suitable for space operations or environments to minimize outgassing and may be applicable to radiation-resistance fibers/shielding while adding little splicing size and weight to the fiber optic components. In some applications, the thermoformed jacket tubing 2 may provide slip plane and/or fixed attachment to the hot melted splice tubing 3. Additionally, the jacket tubing 2 may provide a stake-down point for a fiber spool (not shown).

Figure 2:
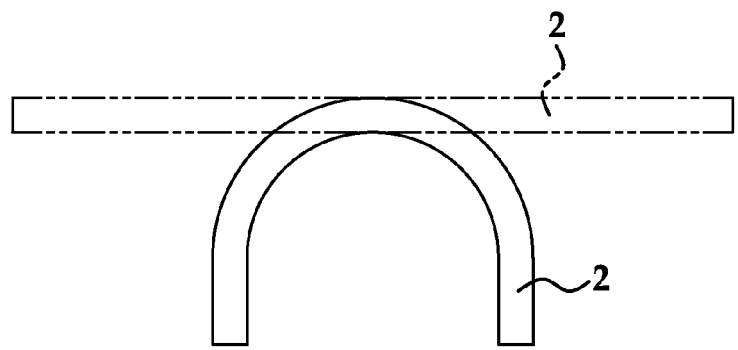
FIG. 2 is a top view illustrating bending of a jacket tubing to a controlled radius according to an illustrative embodiment of the controlled radius splice protector fabrication process.

Referring next to FIGS. 2-7, 9 and 10, an illustrative embodiment of a controlled radius splice protector fabrication process is shown. In FIG. 2, a jacket tubing 2 is provided. The jacket tubing 2 may be PEEK (polyaryletheretherketone) or any other suitable thermo-formable material. The jacket tubing 2 may be thermally preformed to a desired bend radius by heating the jacket tubing 2 above a glass transition temperature (such as about 140 degrees C., for example and without limitation) and bending the jacket tubing 2 to the desired bend radius. The heated jacket tubing 2 may be placed across a ruler (not shown) or other measurement tool to measure the bend radius. The jacket tubing 2 may then be cooled. After cooling, the jacket tubing 2 may maintain the bend radius.

Figure 3:
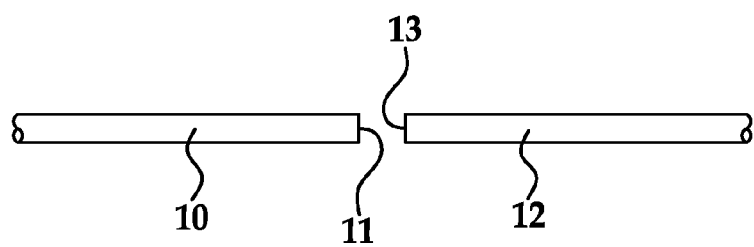
FIG. 3 is a top view of a pair of fiber optic fibers (partially in section), preparatory to splicing the fibers.
Figure 4:
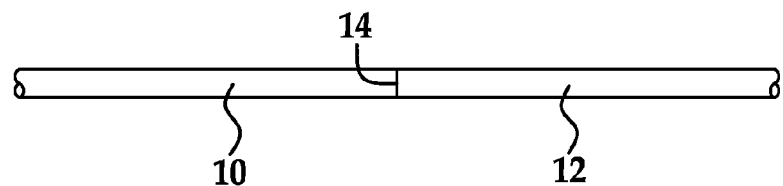
FIG. 4 is a top view of the pair of fiber optic fibers (partially in section) spliced to each other.

In FIG. 3, a first fiber optic fiber 10 (in section) having a fiber end 11 and a second fiber optic fiber 12 (in section) having a fiber end 13 are provided. In FIG. 4, the glass fiber end 11 of the first fiber optic fiber 10 and the glass fiber end 13 of the second fiber optic fiber 12 are melted or fused together, according to the knowledge of those skilled in the art, to form a fiber splice 14. The fiber fusion process may require that the fiber end 11 of the first fiber optic fiber 10 and the fiber end 13 of the second fiber optic fiber 12 be stripped of the buffer (not shown) such that the fusion splicing apparatus (not shown) can align and then melt or fuse the glass ends 11, 13 together.

Figure 5:
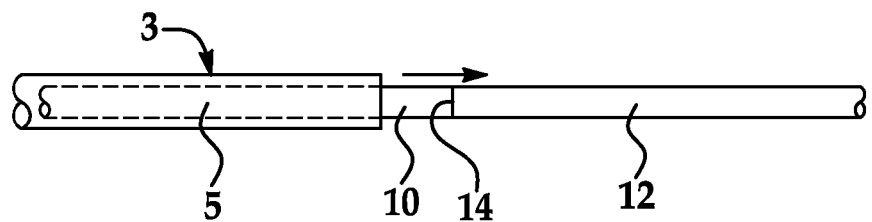
FIG. 5 is a top view of the spliced fiber optic fibers, more particularly illustrating placement of hot melted tubing on the spliced fibers.
Figure 7:
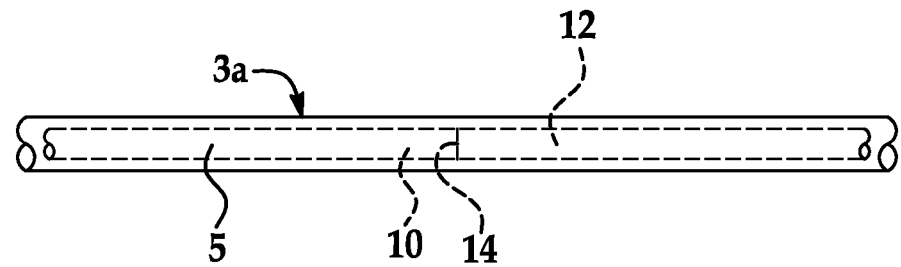
FIG. 7 is a top view of the spliced fibers (shown in phantom) extending through the hot melted tubing.

As shown in FIGS. 5 and 7, splice tubing 3 may then be slid over the fiber splice 14 and melted in place to form hot melted splice tubing 3. In some embodiments the splice tubing 3 may include an inner tubing layer 4 (FIG. 8) which may be an EVA hotmelt (ethane-vinylacetate copolyester), for example and without limitation and an outer tubing layer 5 which may be a copolymer such as polyolefin, for example and without limitation. The hot melted splice tubing 3 may be melted in place on the fiber splice 14 using the same time and temperature as is used in the splice protector processes normally used in fusion splicing. In some applications, the hot melted splice tubing 3 may be heated to about 80 degrees C. for about 30 seconds to melt the melted tubing 3 in place on the fiber splice 14. In some applications, the inner tubing layer 4 of the pre-melted splice tubing 3 may be about 33% longer than the outer tubing layer 5 to allow for shrinkage.

Figure 6:
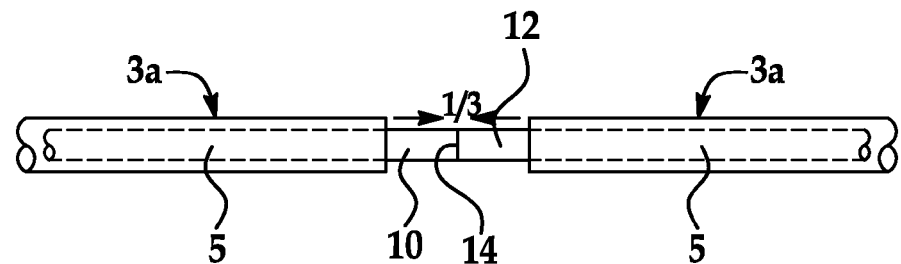
FIG. 6 is a top view of the spliced fiber optic fibers, more particularly illustrating an alternative method in which a pair of hot melted tubing segments is placed on the spliced fibers.

As shown in FIG. 6, in some applications the hot melted splice tubing 3 may be formed as a split tube in which a pair of hot melted tubing segments 3a are extended over the first fiber optic fiber 12 and the second fiber optic fiber 12 and melted in place. This split tube application shown in FIG. 6 may facilitate protection of very small areas in which the fiber splice 14 is located.

As shown in FIG. 9, the hot melted splice tubing 3, through which the first fiber optic fiber 10 and the second fiber optic fiber 12 extends, may next be inserted through the pre-formed jacket tubing 2. The first fiber optic fiber 10, the second fiber optic fiber 12 and the hot melted splice tubing 3 may conform to the selected radius of the thermally pre-formed jacket tubing 2. The entire splice protector assembly may then be thermally conditioned and cycled at the expected operating temperature range of the controlled radius splice protector 1 to relax thermal stresses. In some applications, the thermoformed jacket tubing 2 may provide slip plane and/or fixed attachment to the hot melted splice tubing 3. Additionally, the jacket tubing 2 may provide a stake-down point for a fiber spool (not shown).

Figure 12:
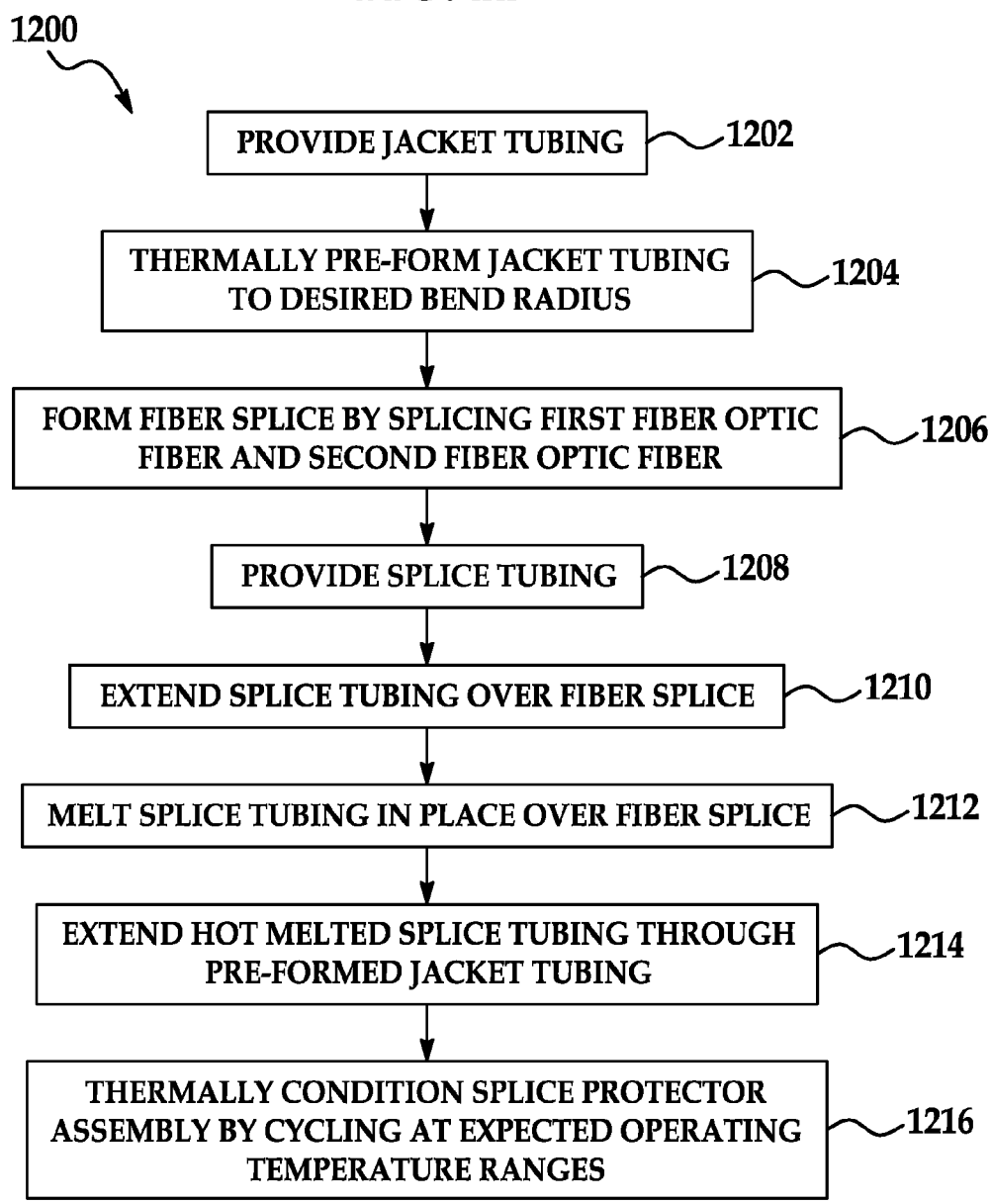
FIG. 12 is a flow diagram which illustrates an illustrative embodiment of a controlled radius splice protector fabrication process.

Referring next to FIG. 12, a flow diagram 1200 which illustrates an illustrative embodiment of a controlled radius splice protector fabrication process is shown. In block 1202, jacket tubing is provided. The jacket tubing may be PEEK (polyaryletheretherketone) or any other suitable thermo-formable material. In block 1204, the jacket tubing is thermally pre-formed to a desired bend radius. In block 1206, a fiber splice is formed by splicing a first fiber optic fiber and a second fiber optic fiber.

In block 1208, splice tubing is provided. In some embodiments, the splice tubing may include an inner tubing layer 4 which may be an EVA hotmelt (ethane-vinylacetate copolyester), for example and without limitation, and an outer tubing layer which may be a copolymer such as polyolefin, for example and without limitation. In block 1210, the splice tubing is extended over the fiber splice. In some embodiments, a pair of hot melted tubing segments may be extended over the fiber splice. In block 1212, the splice tubing may be melted over the fiber splice. In block 1214, the hot melted splice tubing may be extended through the pre-formed jacket tubing. In block 1216, the resulting splice protector assembly may be thermally conditioned by cycling at expected operating temperature and ranges of the splice protector.

Figure 13:
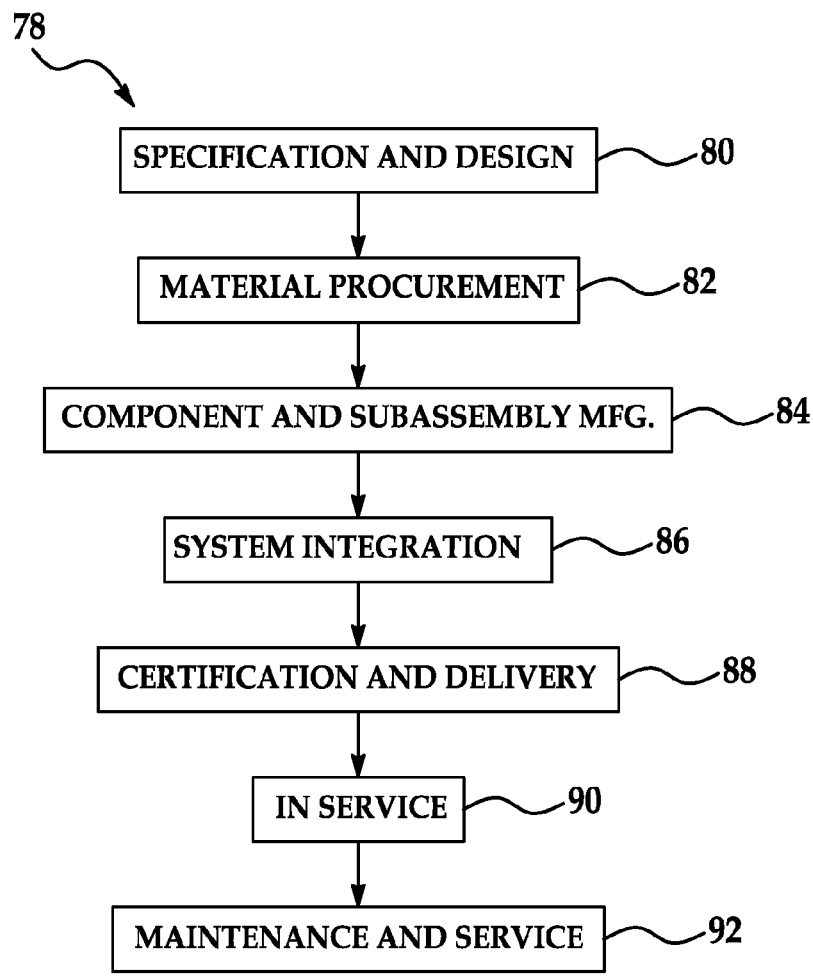
FIG. 13 is a flow diagram of an aircraft production and service methodology.
Figure 14:
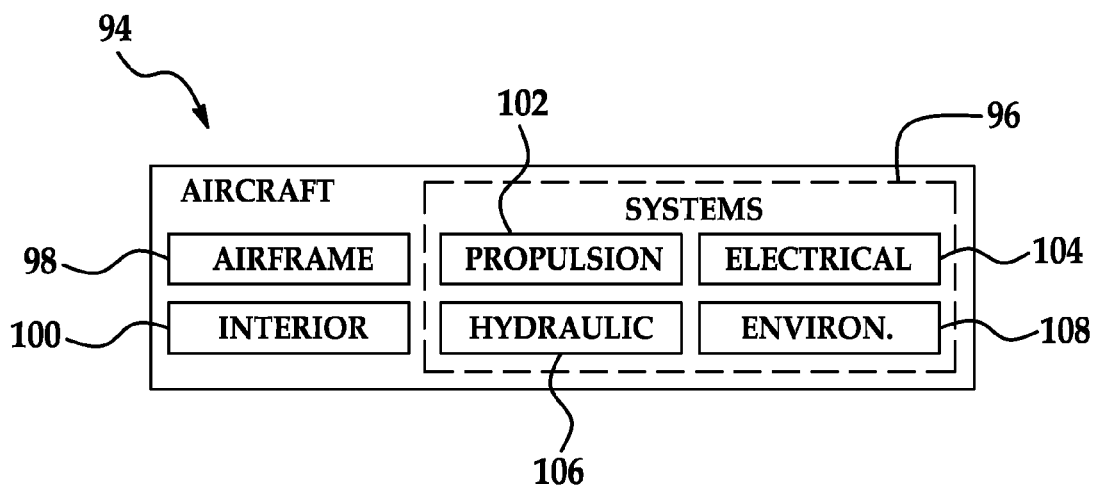
FIG. 14 is a block diagram of an aircraft.

Referring next to FIGS. 13 and 14, embodiments of the disclosure may be used in the context of an aircraft manufacturing and service method 78 as shown in FIG. 13 and an aircraft 94 as shown in FIG. 14. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the disclosure may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An apparatus, comprising:
    a first optic fiber;
    a second optic fiber;
    a fiber splice coupling the first optic fiber and said second optic fiber;
    a melted splice tubing extending over the fiber splice; and
    a thermally conditioned assembly including a curved inflexible jacket tubing to receive the melted splice tubing, the jacket tubing being pre-formed to a bend radius, wherein the assembly is thermally conditioned by cycling the jacket tubing and the splice tubing at an expected operating temperature.

2. The apparatus of claim 1 wherein the melted splice tubing comprises ethane-vinylacetate copolyester.

3. The apparatus of claim 1 wherein the melted splice tubing comprises polyolefin.

4. The apparatus of claim 1 wherein the melted splice tubing comprises an inner tubing layer and an outer tubing layer provided on the inner tubing layer.

5. The apparatus of claim 4 wherein the inner tubing layer comprises ethane-vinylacetate copolyester.

6. The apparatus of claim 4 wherein the outer tubing layer comprises polyolefin.

7. The apparatus of claim 1 wherein the jacket tubing comprises a thermo-formable plastic.

8. The apparatus of claim 7 wherein the thermo-formable plastic comprises polyaryletheretherketone.

9. A method, comprising:
    curving a jacket tubing to a bend radius and forming the jacket tubing to be inflexible at the bend radius;
    coupling first and second optic fibers via a fiber splice;
    melting splice tubing over the fiber splice;
    extending the splice tubing through the curved inflexible jacket tubing; and
    thermally conditioning the splice tubing and the jacket tubing.

10. The method of claim 9 wherein the jacket tubing comprises a thermo-formable plastic material, and wherein forming the jacket tubing to the bend radius to be inflexible comprises thermoforming the jacket tubing after being formed into the bend radius.

11. The method of claim 10 wherein the jacket tubing comprises polyaryletheretherketone.

12. The method of claim 9 wherein the splice tubing comprises ethane-vinylacetate copolymer.

13. The method of claim 9 wherein the splice tubing comprises polyaryletheretherketone.

14. The method of claim 9 wherein the splice tubing comprises an inner tubing layer and an outer tubing layer provided on the inner tubing layer.

15. The method of claim 14 wherein the inner tubing layer comprises ethane-vinylacetate copolyester and the outer tubing layer comprises polyolefin.

16. A method, comprising:
    curving heated tubing to a selected bend radius;
    cooling the tubing while curved to the selected bend radius to form an inflexible curved jacket having the selected bend radius;
    forming a fiber splice by connecting a first optic fiber and a second optic fiber;
    extending splice tubing over the fiber splice;
    extending the fiber splice into the inflexible curved jacket; and
    thermally conditioning the splice tubing and the jacket.

17. The method of claim 16 wherein the tubing comprises a thermo-formable plastic material.

18. The method of claim 16 wherein the splice tubing comprises an inner tubing layer and an outer tubing layer provided on the inner tubing layer.

19. A controlled radius splice protector, comprising:
    a first optic fiber having a first fiber end;
    a second optic fiber having a second fiber end;

a fiber splice connecting the first fiber end of the first optic fiber and the second fiber end of the second optic fiber;

a melted splice tubing extending over the fiber splice and comprising an inner tubing layer and an outer tubing layer; and a curved rigid jacket tubing thermoformed to a selected bend radius, wherein the melted splice tubing is extended into the curved rigid jacket tubing to position the fiber splice within the curved rigid jacket tubing for a thermal conditioning of the curved rigid jacket tubing and the melted splice tubing.

20. A controlled radius splice protector fabrication method, comprising:

thermoforming tubing into a curved inflexible jacket having a selected bend radius;

forming a fiber splice by connecting a first fiber end of a first optic fiber and a second fiber end of a second optic fiber;

extending splice tubing over the fiber splice;

melting the splice tubing on the fiber splice;

extending the splice tubing the curved inflexible jacket; and thermally conditioning the splice tubing and the jacket by cycling the splice tubing and the jacket at expected operating temperature ranges.

\* \* \* \* \*

UNITED STATES PATENT AND TRADEMARK OFFICE
CERTIFICATE OF CORRECTION

PATENT NO. : 8,408,817 B2
APPLICATION NO. : 12/413912
DATED : April 2, 2013
INVENTOR(S) : Noddings et al.

It is certified that error appears in the above-identified patent and that said Letters Patent is hereby corrected as shown below:

In the Claims:

In column 5, line 65 (claim 1), delete "said" before "the second optic fiber".

Signed and Sealed this
Second Day of July, 2013

Teresa Stanek Rea
*Acting Director of the United States Patent and Trademark Office*